United States Patent
Park et al.

(10) Patent No.: US 10,320,821 B2
(45) Date of Patent: *Jun. 11, 2019

(54) DIGITAL SAFETY AND ACCOUNT DISCOVERY

(71) Applicant: Allstate Insurance Company, Northbrook, IL (US)

(72) Inventors: Jason D. Park, Chicago, IL (US); John S. Parkinson, Lake Forest, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,315

(22) Filed: Sep. 22, 2017

(65) Prior Publication Data

US 2018/0027001 A1 Jan. 25, 2018

Related U.S. Application Data

(63) Continuation-in-part of application No. 15/331,434, filed on Oct. 21, 2016, now Pat. No. 9,906,541, which is a continuation-in-part of application No. 15/150,955, filed on May 10, 2016.

(51) Int. Cl.
*G06F 7/04* (2006.01)
*H04L 29/06* (2006.01)
*G06F 21/62* (2013.01)

(52) U.S. Cl.
CPC ...... *H04L 63/1416* (2013.01); *G06F 21/6245* (2013.01); *H04L 63/1425* (2013.01); *H04L 63/1433* (2013.01); *H04L 63/101* (2013.01)

(58) Field of Classification Search
CPC ............ H04L 63/1416; H04L 63/1425; H04L 63/1433; G06F 21/6245
USPC ...................................................... 726/22–25
See application file for complete search history.

(56) References Cited

U.S. PATENT DOCUMENTS

| | | | |
|---|---|---|---|
| 9,077,747 B1* | 7/2015 | Chen | H04L 63/1441 |
| 2004/0133564 A1* | 7/2004 | Gross | G06F 17/30398 |
| 2004/0250115 A1* | 12/2004 | Gemmel | G06F 21/562 |
| | | | 726/24 |
| 2006/0226216 A1 | 10/2006 | Keithley et al. | |
| 2006/0272024 A1 | 11/2006 | Huang et al. | |
| 2008/0091591 A1* | 4/2008 | Egnatios | G06Q 20/10 |
| | | | 705/38 |

(Continued)

OTHER PUBLICATIONS

Dhinakaran et al., "An Empirical Study of Spam and Spam Vulnerable email Accounts," Future Generation Communication and Networking (FGCN 2007) Year: 2007, vol. 1 pp. 408-413.*

(Continued)

*Primary Examiner* — Roderick Tolentino
(74) *Attorney, Agent, or Firm* — Banner & Witcoff, Ltd.

(57) ABSTRACT

Methods, computer-readable media, software, and apparatuses may assist a consumer in keeping track of a consumer's accounts in order to prevent unauthorized access or use of the consumer's identified accounts. To discover the various accounts, the methods, computer-readable media, software, and apparatuses can monitor at least a consumer's email accounts, web browser history, and web cache. The discovered accounts may be displayed to the consumer along with recommendations and assistance for closing unused or unwanted accounts to prevent unauthorized access or use.

17 Claims, 6 Drawing Sheets

(56) References Cited

U.S. PATENT DOCUMENTS

| | | | |
|---|---|---|---|
| 2008/0215488 A1 | 9/2008 | Jackman et al. | |
| 2009/0293125 A1* | 11/2009 | Szor | G06F 21/56 |
| | | | 726/24 |
| 2011/0166988 A1 | 7/2011 | Coulter | |
| 2011/0204138 A1* | 8/2011 | Ukuda | G06Q 40/02 |
| | | | 235/379 |
| 2013/0013476 A1 | 1/2013 | Knafelz et al. | |
| 2013/0061179 A1* | 3/2013 | Alletto | G06Q 40/00 |
| | | | 715/843 |
| 2013/0179360 A1 | 7/2013 | Baker et al. | |
| 2013/0238721 A1* | 9/2013 | Patel | G06Q 10/107 |
| | | | 709/206 |
| 2013/0246146 A1* | 9/2013 | Fischer | G06Q 30/0222 |
| | | | 705/14.23 |
| 2013/0268839 A1* | 10/2013 | Lefebvre | G06F 17/21 |
| | | | 715/234 |
| 2013/0298192 A1 | 11/2013 | Kumar et al. | |
| 2014/0115067 A1* | 4/2014 | Rosenwald | G06Q 10/107 |
| | | | 709/206 |
| 2014/0282977 A1 | 9/2014 | Madhu et al. | |
| 2015/0229664 A1 | 8/2015 | Hawthorn et al. | |
| 2015/0278907 A1* | 10/2015 | Nice | G06Q 30/0631 |
| | | | 705/26.7 |
| 2016/0044054 A1 | 2/2016 | Stiansen et al. | |
| 2016/0065594 A1* | 3/2016 | Srivastava | H04L 63/1433 |
| | | | 726/23 |
| 2016/0065614 A1 | 3/2016 | Stolfo et al. | |
| 2016/0071140 A1* | 3/2016 | Sherman | G06Q 30/0226 |
| | | | 705/14.27 |
| 2016/0163186 A1* | 6/2016 | Davidson | G06Q 50/16 |
| | | | 340/506 |

OTHER PUBLICATIONS

Fowdur et al., "An email application with active spoof monitoring and control," 2016 International Conference on Computer Communication and Informatics (ICCCI) Year: 2016 pp. 1-6.*
Oct. 19, 2017—(US) Notice of Allowance—U.S. Appl. No. 15/331,434.
Fowdur et al, "An Email Application w/ Active Spoof Monitoring and Control", 2016 International Conference on Computer Communication and Informatics (ICCCI0, Year 216, pp. 1-6.
Nov. 17, 2017—(WO) International Search Report—PCT/US17/57521.
Jan. 19, 2018—(US) Non-Final Office Action—U.S. Appl. No. 15/150,955.
Jan. 5, 2017—(US) Non-Final Office Action—U.S. Appl. No. 15/331,434.
May 16, 2017—(US) Final Office Action—U.S. Appl. No. 15/331,434.
Sep. 15, 2017—(PCT) International Search Report—PCT/US17/31940.
Jul. 24, 2018—(US) Non-Final Office Action—U.S. Appl. No. 15/868,230.
Aug. 24, 2018—(US) Final Office Action—U.S. Appl. No. 15/150,955.
Dec. 13, 2018—(US) Non-Final Office Action—U.S. Appl. No. 15/150,955.

* cited by examiner

DIGITAL SAFETY AND ACCOUNT DISCOVERY

This application is a continuation-in-part of and claims priority to U.S. patent application Ser. No. 15/331,434, filed on Oct. 21, 2016; which in turn is a continuation-in-part and claims priority to U.S. patent application Ser. No. 15/150,955, filed on May 10, 2016. These applications are incorporated herein by reference in its entirety.

FIELD OF ART

Aspects of the disclosure generally relate to methods and computer systems, including one or more computers particularly configured and/or executing computer software. More specifically, aspects of this disclosure relate to systems for identifying, categorizing, and managing online accounts.

BACKGROUND

Protecting confidential information in today's online environment is difficult due to the increased connectivity and the increased number of consumer accounts accessible via web enabled computing devices. Consumers today have a large number of online subscriptions and keeping track of all of them is difficult and time consuming. Many consumers have subscriptions and financial accounts that they have long forgotten about but those subscriptions and financial accounts may still be active and accessible online. It is important from a digital safety perspective that consumer be aware of all of their online accounts and be diligent in closing unused or no longer wanted subscriptions.

Further, as consumers continue to gain an ever-increasing presence in online environments, there will be an ever-present need to better protect consumers from confidential information being breached (e.g., made available publicly) in order to protect consumers from fraud and/or other harms.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for use by a consumer in order to keep track of a consumer's accounts and to prevent unauthorized access or use of the consumers identified subscriptions and financial accounts. The discovered subscriptions and financial accounts may be listed and displayed to the consumer along with recommendations and assistance for closing any discovered unused or unwanted financial accounts and subscriptions. The described cyber-security system may prevent unauthorized access, use, and security breaches by unauthorized users and devices of the consumer's accounts.

In some aspects, the cyber-security system may include a cyber-security account analysis system and a cyber-security data processing system. The cyber-security system may include at least one processor and a memory unit storing computer-executable instructions. The cyber-security system may be configured to, in operation, generate a consumer profile based on consumer information, scan a consumer device to determine potential security threat, and associate the consumer device and the results of the scan with the generated consumer profile. The cyber-security system may also be configured to, in operation, monitor at least one email account of the consumer. The cyber security system may be configured to, in operation, determine source information for each email correspondence in the monitored at least one email account. Based on the determined source information for each email correspondence, the cyber-security system may generate a list of financial institutions and other businesses associated with the consumer. The cyber-security system may, in operation, also determine for each email correspondence a likelihood that each email correspondence represents an account of the consumer. Based on the determined likelihood that each email correspondence represents a subscription of the consumer, the cyber-security system may generate a list of accounts associated with the consumer.

In other aspects, the cyber-security system may also be configured to, in operation, monitor at least a consumer's internet browser history and internet browser cache in addition to a consumer's email accounts. The cyber security system may be configured to, in operation, generate a list of financial institutions and other businesses associated with the consumer based on a consumer's internet browser history and internet browser cache. Using the various lists of financial institutions and other businesses created from the analysis of a consumer's email, browser history, and browser cache, the cyber-security system may, in operation, also determine the likelihood whether a consumer has an account to the various financial institutions and other businesses.

The cyber-security system may, in operation, recommend closing accounts associated with the consumer based on security recommendations. The cyber-security system may also, in operation, assist or automate closing of any selected accounts. The cyber-security system may also in operation, assist or automate updating personal information contained within any of the selected accounts, such as updating a consumer's address after a move across all of the consumer's selected accounts.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for protecting consumers against data breaches and unauthorized use of accounts. A consumer may be presented with a wide range of consumer risks, including cyber-extortion (e.g., ransomware), false/fraudulent account creation, credit card theft, credit score reduction, banking theft, and tax fraud. By monitoring and providing a user with a comprehensive listing of all of their subscriptions and financial accounts, a cyber-security system can assist a user in closing unused or unwanted accounts preventing unauthorized use or loss of confidential data from those listed subscriptions and financial accounts.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
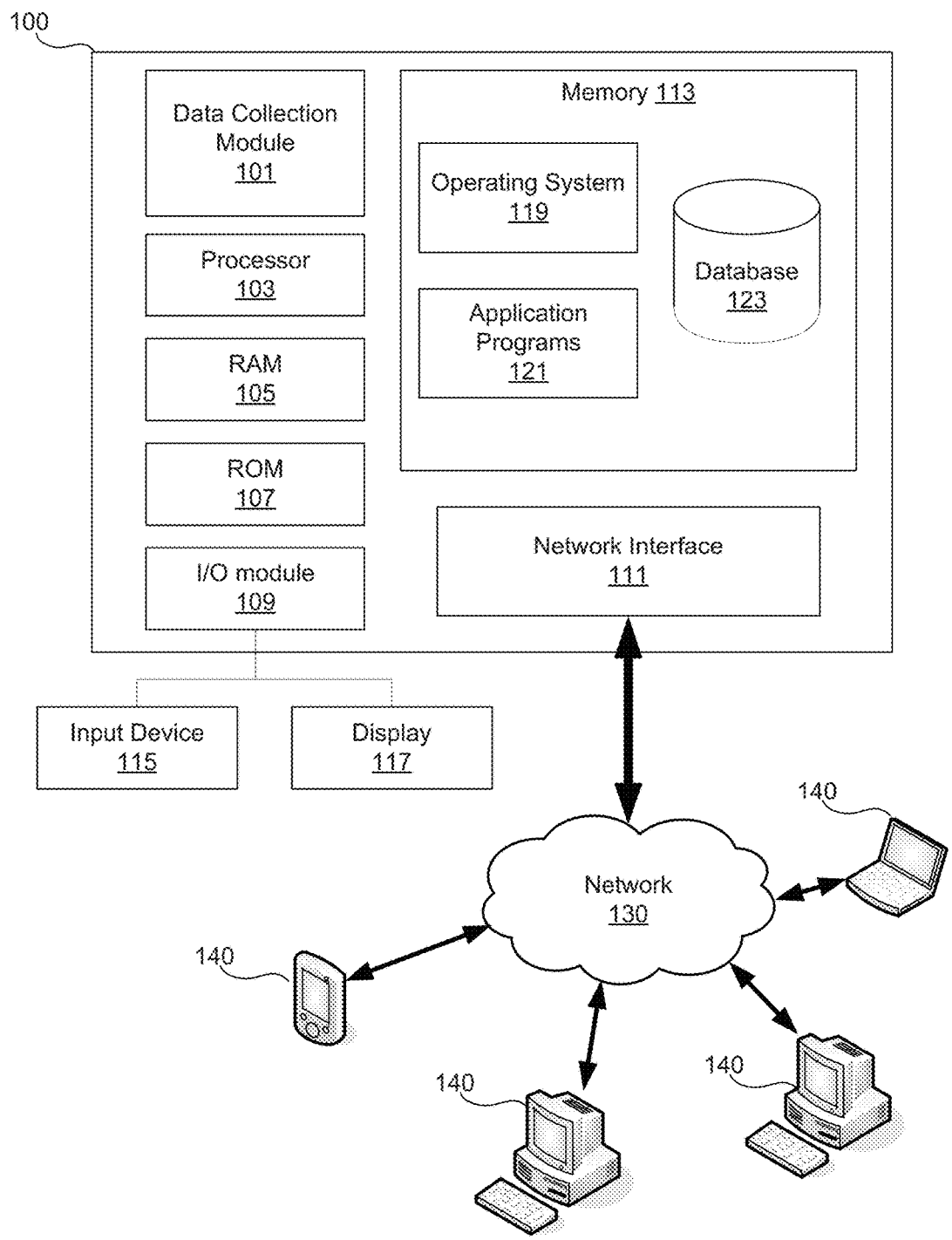
FIG. 1 illustrates an example cyber-security device that may be used in accordance with one or more aspects described herein.

In one or more arrangements, aspects of the present disclosure may be implemented with a computing device. FIG. 1 illustrates a block diagram of an example cyber-security device 100 that may be used in accordance with aspects described herein. The cyber-security device 100 may be a computing device, such as a personal computer (e.g., a desktop computer), server, laptop computer, notebook, tablet, smartphone, vehicles, home management devices, home security devices, smart appliances, etc. The cyber-security device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, cyber-security device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the security monitoring device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the security monitoring device 100 may provide input data. The I/O module 109 may also be configured to be connected to a display device 117, such as a monitor, television, touchscreen, etc., and may include a graphics card. The display device 117 and input device 115 are shown as separate elements from the cyber-security device 100; however, they may be within the same structure. On some cyber-security devices 100, the input device 115 may be operated by users to interact with the data collection module 101, including providing user information and/or preferences, device information, account information, warning/suggestion messages, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the cyber-security device 100 to perform various functions. For example, memory 113 may store software used by the cyber-security device 100, such as an operating system 119 and application programs 121, and may include an associated database 123.

The network interface 111 allows the cyber-security device 100 to connect to and communicate with a network 130. The network 130 may be any type of network, including a local area network (LAN) and/or a wide area network (WAN), such as the Internet, a cellular network, or satellite network. Through the network 130, the cyber security device 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as cyber-security device 100. In some embodiments the cyber-security monitoring device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
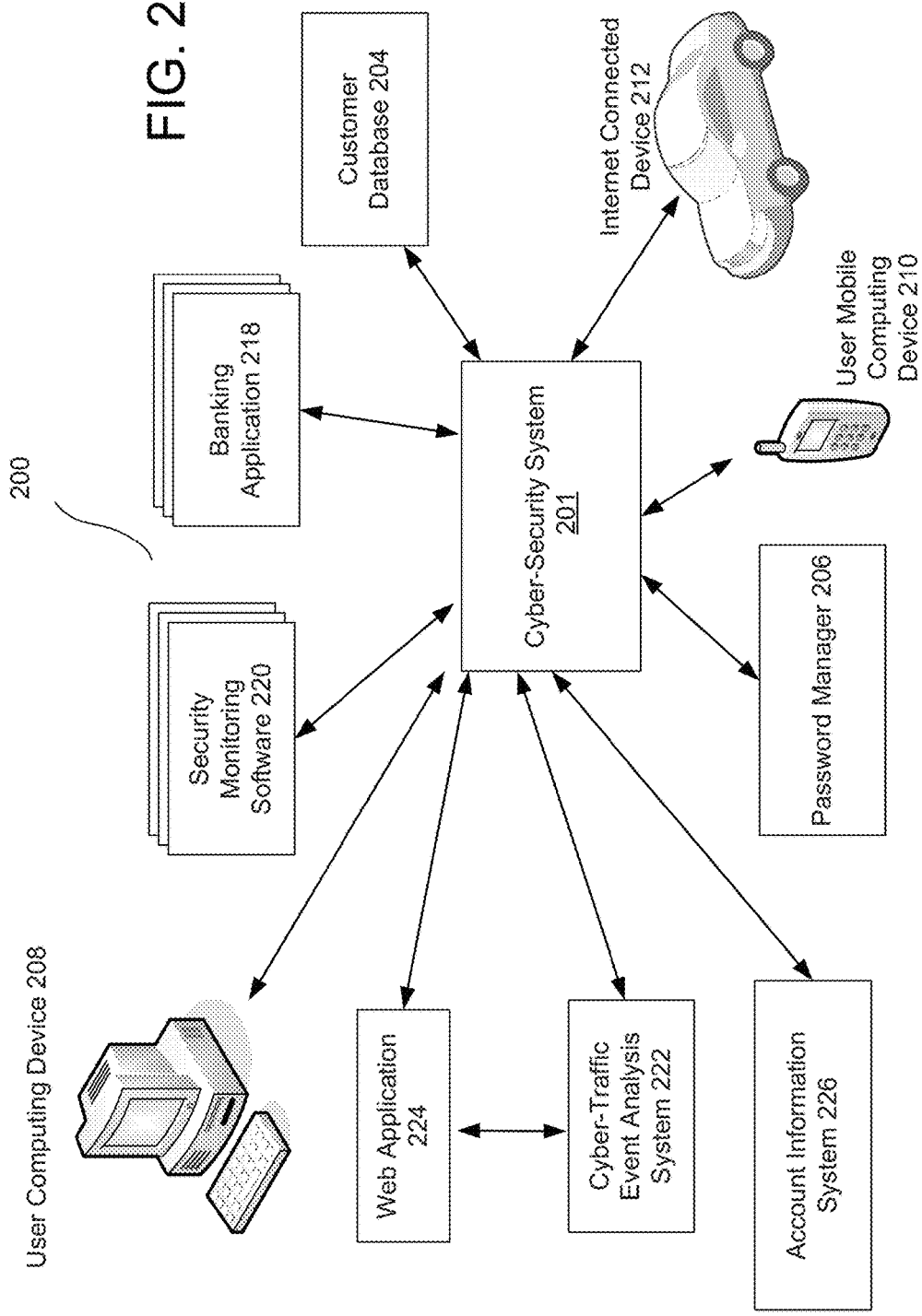
FIG. 2 shows a block diagram illustrating the system architecture for a cyber-security system in accordance with one or more aspects described herein.

FIG. 2 shows a block diagram illustrating system architecture 200 for a cyber-security system. A cyber-security system 201 may collect information from and transmit information to a consumer through various different channels such as a user mobile computing device 210, a user computing device 208, a password manager 206, banking application 218, and a web application 224. In some instances, the cyber-security system 201 may be a cyber-security computing device 100. Cyber-security system 201 may receive user data for its consumers through channels such as customer database 204, internet connected device 212, account information system 226, and cyber-traffic event analysis system 222. The cyber-security system 201 may communicate with one or more network-based accounts to detect information associated with a consumer account being communicated through a network.

In some embodiments, cyber-security system 201 may collect information from and transmit information to each of the various applications, databases, devices, and backend servers described in FIG. 2. Cyber-security system 201 may collect information about consumers such as their real-time activity and interactions, predict the likelihood of a data breach or unauthorized use of an account, and determine strategies utilizing the various channels of communication with the consumer so as to determine how to best engage the consumer and protect the consumer from future threats. For example, cyber-security system 201 may collect information about a local network associated with a consumer based on receiving a network scan from the security monitoring software 220. Cyber-security system 201 may analyze historic account information received from the account information system 226 to determine the likelihood of a data breach based on risk factors known for consumers with similar habits and/or characteristics. Cyber-security system 201 may determine that the user may be engaging in particularly risky behavior, and may determine when to contact the consumer and through which channel to contact the consumer to inform the consumer of the potential for a data breach. Cyber-security system 201 may enable a plurality of different permutations of strategies such as the above example by being able to sense real-time consumer actions and consumer-related data flow through various different channels. By analyzing data relevant to that consumer, the cyber-security system 201 may inform various channels that it is communicatively coupled to regarding consumer-associated risks.

In some embodiments, cyber-security system 201 may communicate with a user (e.g., a consumer) and gather user data through banking application 218. Cyber-security system 201 may collect user data from interactions of the user with the user interface of the banking mobile application 218. The banking application 218 may allow the user to manage account preferences, manage financial accounts, view recent transactions, and/or review suspicious behavior. Cyber-security system 201 may track interactions with banking applications and/or receive notifications from the applications. For example, a notification regarding a recent suspicious banking transaction may be sent from a banking server to the banking application 218 and (either from the banking server or via the banking application 218) forwarded to the cyber-security system 201. This may cause the cyber-security system 201 to inform the consumer of the suspicious activity.

In some embodiments, a password manager 206 may assist the cyber-security system 201 in determining the presence of consumer-associated accounts, and/or may assist the cyber-security system 201 in determining the quality of credentials for the consumer-associated accounts. A risk-factor for a data breach may be a consumer who uses poor credentials (e.g., usernames, passwords, biometric information, etc.) for online accounts (e.g., weak passwords, using passwords for multiple accounts, a failure to use two-factor authentication, etc.). The password manager 206 may inform the cyber-security system 201 of known accounts associated with the password manager 206, as well as the status of the credentials associated with those accounts. In some instances, the cyber-security system 201 may compare the accounts known to the password manager 206 with other accounts known to the cyber-security system 201 to determine what accounts are protected through password management.

In some embodiments, the customer may interact with the cyber-security system 201 using the user computing device 208, web application 224, and/or user mobile computing device 210. The user may be able to view their current security status, see listings of all of their financial accounts and subscriptions, see updates regarding security issues, seek remediation of those issues, and/or undergo further training regarding security practices. In some instances, if a data breach occurs, the consumer may be presented an option to file an insurance claim for the security breach via the cyber-security system 201 and/or through an associated application.

In some embodiments, the cyber traffic event analysis system 222 may monitor user activity on social media networks, the Internet in general, or the dark web (e.g., network-enabled websites with restricted addresses or accessibility such that the sites are not accessible using standard means, such as websites with no domain names that are hidden from online search engines). In some instances, the cyber-traffic event analysis system 222 may determine how much of a consumer's confidential (e.g., private) information is available electronically. Confidential information may comprise identity information such as name or birthday, marital status, family members, education, employment histories, online identities (e.g., user names on a social media account), financial information (e.g., banking numbers, credit card numbers, etc.), traceable assets (real estate, vehicles, etc.), court records, or other such information. By searching for electronically available information, the system may determine a "digital footprint" (e.g., a trail of data and information, available electronically and associated with the consumer). For example, the cyber-traffic event analysis system 222 may determine that a consumer's home address is available on 3 social media sites, 5 public web pages, and 2 dark web pages. The cyber-traffic event analysis system 222 may also search for instances where confidential information has become available. For example, the cyber-traffic event analysis system may further determine that one of the dark web pages has a credit card ending in "XXXX" associated with the consumer's address. The cyber-traffic event analysis system 222 may inform the cyber-security system 201 of its findings, and the cyber-security system 201 may act on those findings. For example, the cyber-security system 201 may determine that the credit card number corresponds to the consumer, and push an alert to an application on the user's mobile computing device 210 notifying the user that their credit card number may have been breached.

In some embodiments, in addition to collecting user information from mobile applications and web applications, user information for consumers may be collected from various other channels such as user computing device 208, user mobile computing device 210, and internet connected device 212. The cyber-security system 201 may determine devices associated with the consumer. The cyber-security data processing system may determine characteristics of those devices, such as their operating systems, update history, software on the devices, hardware characteristics, and so forth. The cyber-security system 201 may use this information to determine if the number of devices and/or characteristics of the devices indicate a heightened threat of a data breach.

In some embodiments, the account information system 226 may maintain and dynamically update records of accounts for a consumer. For example, the account information system 226 may interface with social networking accounts associated with the consumer. If an account is breached (or if suspicious activity is detected), the cyber-security system 201 may be notified. The cyber-security system 201 may then notify the consumer, such as by sending an alert to a user computing device 208 and/or user mobile computing device 210.

In an embodiment, the collected user information may be used to generate a consumer profile for the consumer. The consumer profile may be updated periodically as new consumer information is gathered or received. In an embodiment, a consumer profile may be a categorization of what other or external entities know about the user such as what marketers know about a user, information found on social media about the user, the home state of the user and other potential categorizations.

Figure 3:
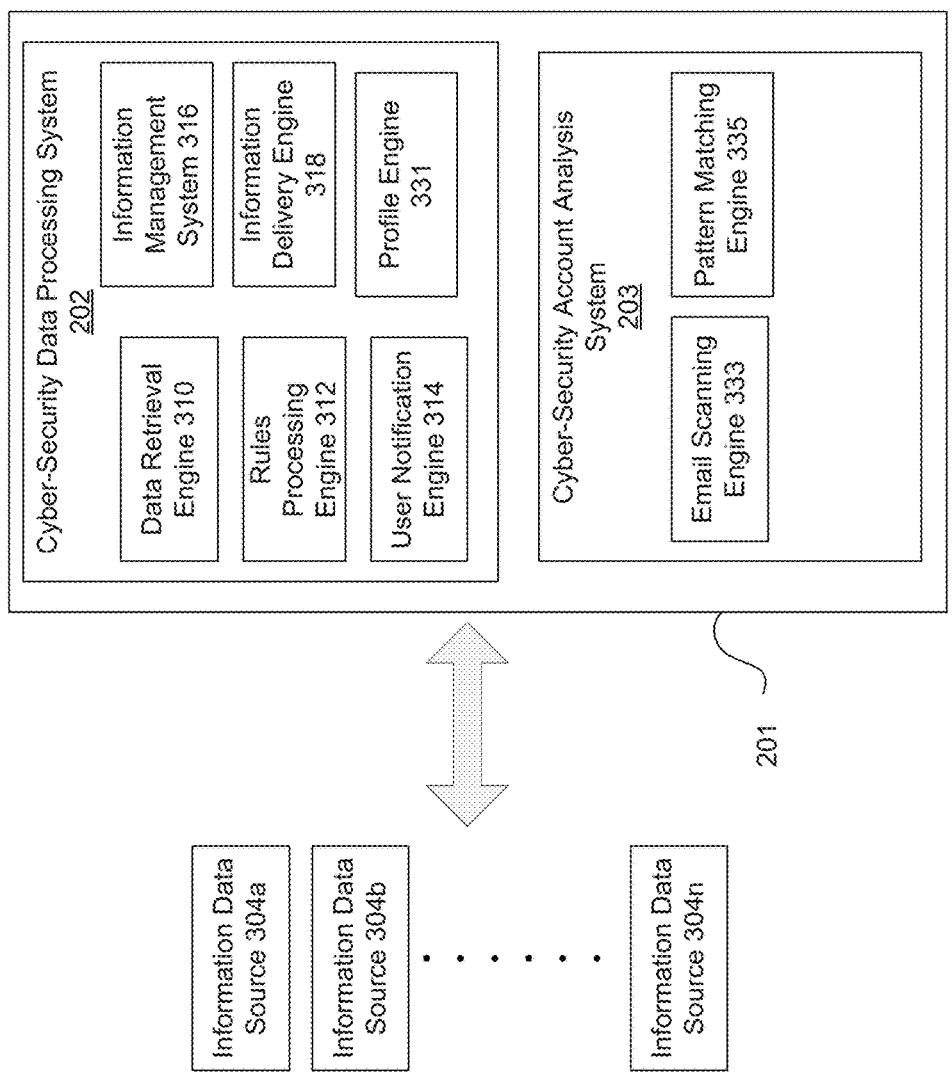
FIG. 3 illustrates a block diagram of a cyber-security system that collects information from various information data sources to assist a consumer in keeping track of numerous accounts in accordance with one or more aspects described herein.

FIG. 3 illustrates a block diagram of a cyber-security system that collects information from various information data sources to assist a consumer in keeping track of numerous accounts. As shown in FIG. 3, the cyber-security system may communicate with a plurality of information data sources 304a, 304b, . . . 304n to collect information related to the consumer to determine next steps to best serve the consumer.

In some embodiments, the cyber-security system 201 may comprise a cyber-security data processing system 202 and a cyber-security account analysis system 203. The cyber-security data processing system 202 may retrieve information from the plurality of information data sources 304a-304n in order to determine the digital presence of a consumer. The data retrieval engine 310 may be configured to monitor (e.g., continuously monitor) each of the information data sources 304a-304n and report data of interest from any one of these data sources to the cyber-security system 201. For example, the data retrieval engine 310 may monitor social media sources to determine if account information associated with the consumer is detected. If the information is detected, it may be passed on to the cyber-security system 201 for analysis. In another example, the data retrieval engine 310 may interface with one or more digital accounts (banking accounts, social media accounts, digital storefronts, etc.) to determine if accounts are created, active, and/or in use. Account information may be passed on to the cyber-security system 201.

In an embodiment, the collected information regarding a consumer may be used to determine an online presence for a consumer (e.g., the spread of information or "footprint" left by a consumer in digital spaces).

In an embodiment, determined social media sources of the consumer may be monitored to determine if something malicious or believed to breach the terms of use of the site has been detected. Such monitoring may detect unauthorized use of the consumer's social media accounts.

In an embodiment, cyber-security data processing system 202 may generate a consumer profile at profile engine 331. The consumer profile may be generated using at least in part data received and/or collected from information data sources 304-304n. The consumer profile may include details of the consumer including but not limited to a consumer's name, age, address, driver's license number, credit card or bank information, insurance policies, networked devices associated with the consumer etc. In an embodiment, the consumer may themselves enter additional or confirm information found in their consumer profile through a mobile application or computing device interface. Additional information that may be entered by the consumer includes financial account details and or verification of online accounts used by a consumer.

In an embodiment, cyber-security data processing system 202 may scan a consumer device to determine potential security threats. Based on the scan a device profile may be generated at profile engine 331. The device profile may be analyzed to determine if the device has any known vulnerabilities based on the installed hardware components and loaded software applications. In an embodiment, the consumer device and the results of the device scan may be added to the consumer's generated profile.

In some embodiments, the cyber-security system 201 may calculate risk based on the data gathered from the information data sources 304a-304n. For example, the insurance rules processing engine 312 may analyze the data retrieved from information data sources 304a-304n by the data retrieval engine 310 according to preset rules and/or algorithms in order to determine the likelihood of a data breach based on the digital presence of the consumer.

In some embodiments, the cyber-security system 201 may determine when and through which means to notify a consumer of the risks of a data breach and/or evidence of a data breach according to preset rules and strategies calculated from the data gathered from the information data sources 304a-n. For example, the user notification engine 314 may determine a time to contact the consumer with a message and/or notification generated by the cyber-security system 201 upon analyzing the activities of the consumer and processing such activities according to risk matrices maintained by cyber-security system 201.

In some embodiments, the cyber-security system 201 may manage the various activities of each consumer, and the status of various accounts associated with the consumer. For example, the information management system 316 may keep track of all of the information received from information data sources 304a-304n and may also manage a schedule of message delivery by communicating with the user notification engine 314. In another example, the cyber-security system 201 may notify the user whenever an account is accessed at an unexpected time and/or from an unexpected location.

In some embodiments, the cyber-security system 201 may determine which channel to use to communicate the decision of a strategy computed at the cyber-security system 201. For example, the information delivery engine 318 may detect which mobile application accessible to the user is the most appropriate channel on which to deliver the type of information that is scheduled to be delivered to the consumer and/or other target audience.

In some additional embodiments, cyber-security account analysis system 203 may generate a listing for the consumer of discovered online accounts associated with the consumer. The accounts may be categorized into various groups such as financial accounts and subscriptions associated with the consumer. The categorized listings may assist a consumer in keeping track of their numerous online accounts all of which may contain various forms of confidential information.

In an embodiment, cyber-security account analysis system 203 may monitor a consumer's email accounts to determine a listing of the consumer accounts with financial institutions. Similarly, a consumer's email accounts may also be monitored to determine the number of online subscription accounts associated with the consumer.

In an embodiment, cyber-security account analysis system 203 may generate separate lists for a consumer listing all of the consumer's discovered financial accounts and all of the consumer's online subscriptions. The generated lists may be used to assist the consumer in closing unused or wanted accounts in order to reduce the risk of confidential information being obtained and prevent unauthorized use of accounts a user may have long forgotten about. In another embodiment, cyber-security account analysis system 203 may upon discovery of consumer's accounts allow the consumer to globally change information such as a consumer address or phone number across all of the discovered accounts simultaneously. The aggregation and consolidation mechanism of the present disclosure may allow a consumer to update and manage numerous accounts efficiently.

Figure 4:
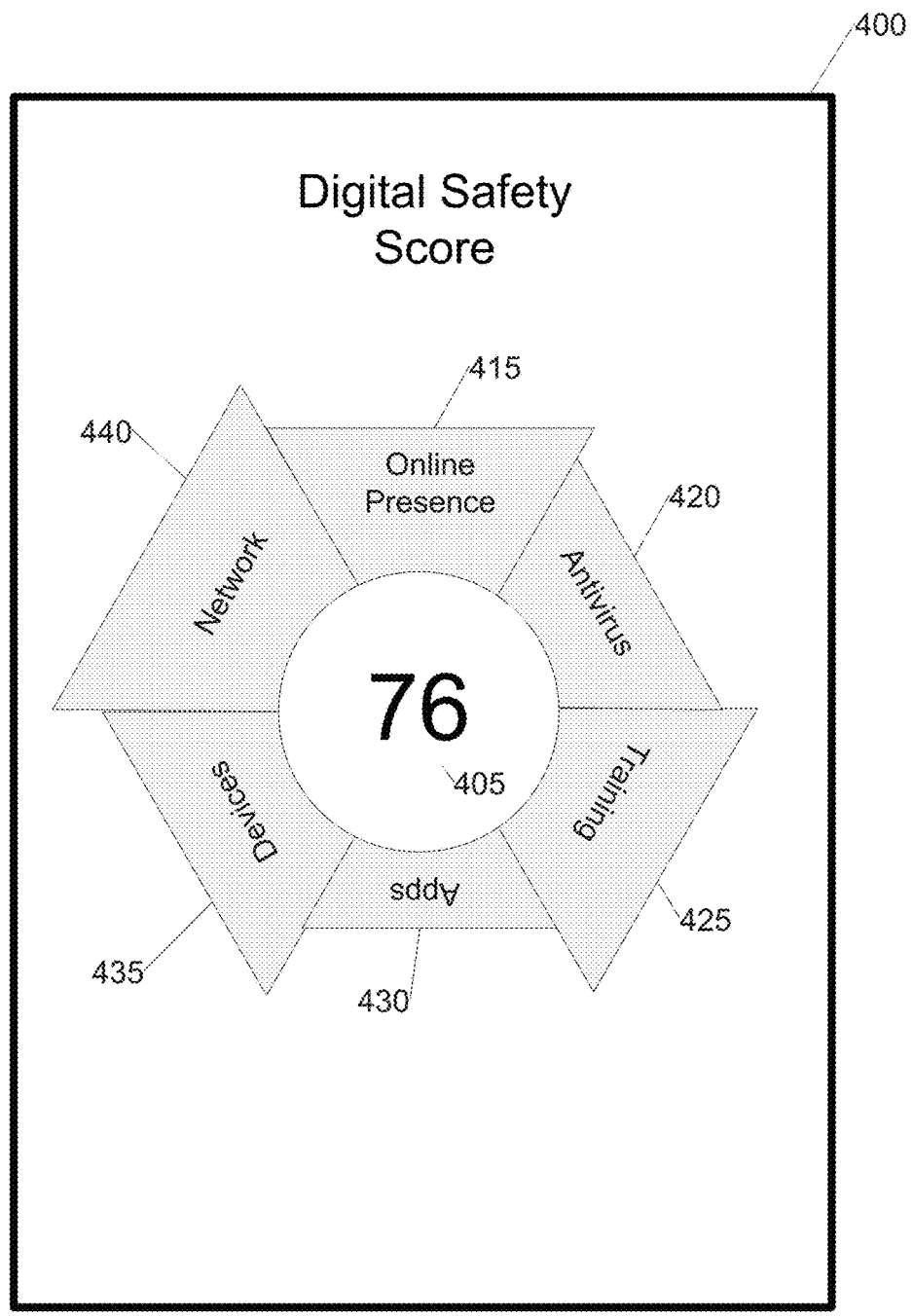
FIG. 4 illustrates an example user interface displaying an example rating screen in accordance with one or more aspects described herein.

FIG. 4 illustrates a user interface 400 displaying an example rating screen for a digital safety score 405. In some examples, these user interfaces may be generated by an application server, web application 224, user computing device 208, and/or user mobile computing device 210. It should be understood that the user interface of FIG. 4 is designed to illustrate various features and aspects of the user interfaces and the system, and do not limit the visual appearance or layout of the user interfaces. The mobile computing device 210 may be a smartphone, and the user interface 400 may be part of a smartphone app. A shortcut may be presented on a home screen (or desktop screen) of an operating system executing the user interface 400.

A digital safety score 405 may be a rating and/or representation of different components which contribute to the risk of a data breach of an associated consumer. The digital safety score 405 may be a numeric value that indicates the risk of a data breach. While the description herein assumes a higher score reflects a lower chance of a data breach, any algorithm for determining the value may be used. For example, the digital safety score 405 may comprise a value from 0 to 200, where an algorithm determines the value such that a higher value indicates a lower risk of a data breach. In some instances, a lower number may indicate lower risk. For example, a value from 0 to 100 may be assigned, wherein the value approximates the chance of a significant data breach within the next year.

The components depicted in user interface 400 are merely exemplary components, and any number of components that affect the possibility of a data breach may be used. The components may be represented with shapes that correspond to their strength and/or impact. For example, triangles or wedges may be sized in proportion to their impact versus other components (e.g., larger shapes correspond to a larger impact than smaller shapes). In another example, shapes may vary in size based on the risk associated with each item (e.g., a larger shape may indicate an area with higher associated risk). In some instances, a shaded ring or pie graph may be divided into different proportional sections for each component that contributes to the risk of a data breach. In some instances, a combination of the above may be used. For example, the width of wedges may indicate the proportion of the score, while the height may indicate whether the component has a positive or negative impact, and a ring around the wedges may indicate the proportion of a maximum score achieved.

A number of exemplary components are depicted in FIG. 4. An online presence component 415 may indicate the online presence of a consumer. For example, a consumer may have 48 different accounts detected across a range of Internet services. The cyber-security system 201 may determine that the relatively high number of accounts increases the potential risk of a data breach. Accounts may be associated with financial institutions or may represent subscriptions or memberships associated with the consumer. Accounts may be judged based on the type of account. For example, a large number of banking accounts may greatly increase the risk of a significant data breach, because a breach may result in important financial data being compromised. In another example, a large number of website accounts comprising only a username and password (such as accounts on a cookbook website, a news website, a sports website, etc.) may be weighted less than a smaller number of banking accounts, because the impact of a data breach to the consumer may be minimal compared to the impact of a breach regarding banking information. In some instances, the usage of usernames and/or passwords may be tracked and used to determine a component of the digital safety score 405. For example, a password manager may report that three passwords are used across 48 accounts. This may greatly increase the danger of a data breach, as a breach of a password across one account may affect a large number of other accounts. In some instances, this may increase the probability of a data breach, which may be reflected in the rating.

Some components may monitor devices and/or environments associated with a consumer. A network component 440 may indicate the quality of networking security associated with a consumer. The cyber-security system 201 may receive information indicating the types of devices on a network (e.g., switches, routers, etc.), the configurations of the devices (e.g., encryption methods used, wireless vs. wired connections, software updates installed, credentials required for access, etc.), and/or how many devices are connected. For example, the cyber-security system 201 may communicate with a home network associated with the consumer to determine that the consumer has a wireless router with a non-default administrative password, a WPA2 encrypted SSID that is not broadcast, two connected wireless devices, and a connected wired device. The cyber-security system cyber-security system 201 may determine a rating based on the strength of the network and/or the potential for the network to be breached. An antivirus component 420 may indicate the health of one or more devices associated with the consumer. An antivirus may decrease the probability of a data breach by protecting software and/or hardware from malicious intrusions. The digital safety score 405 may thus be increased for every device with an installed antivirus, and may be lowered if a problem is detected. A devices component 435 may indicate risks associated with the number of and/or quality of devices associated with a consumer. A consumer may be more at risk for a data breach if more devices with access to consumer accounts exist. For example, the cyber-security system 201 may determine that an old, forgotten tablet with an outdated operating system is associated with the user. The tablet may present an intrusion point due to unpatched vulnerabilities. Thus, the tablet may reduce the digital safety score 405.

An applications component 430 may also impact the digital safety score 405. The cyber-security system 201 may receive information from one or more connected services. For example, a credit monitoring service may report fraudulent activity on a credit card, which may decrease the digital safety score. In another example, a consumer identify protection service may provide information on whether any breaches have been detected by their service, which may affect the score.

A training component 425 may adjust the digital safety score 405 based on training conducted by the consumer. A consumer may be able to watch training videos, read articles, take quizzes, or listen to audio regarding cyber-security. For example, the user may be able to interact with the displayed training component to see options for training. If the user engages in training items, the user may be rewarded through an increased digital safety score. This may help encourage the user to stay informed regarding best practices for cyber-security.

In some instances, accounts may be centrally consolidated and/or cancelled. Accounts may be consolidated in the listing, such as by providing a centralized login for multiple accounts. For example, a service provider associated with the cyber-security system 201 may provide a centralized login screen with a consolidated username and password. A consumer may select accounts from the listing of detected accounts with which to use the centralized login screen. The consumer may also select unwanted accounts from the listing for cancellation. In some instances, the cyber-security system 201 may direct the consumer to a web page associated with each account for cancelling each account. In other instances, the cyber-security system 201 may process the selections by coordinating with one or more services to cancel accounts. This may have the advantage of reducing the digital footprint for a consumer by reducing the number of active accounts.

In an embodiment, cyber-security system 201 may initiate a scan for consumer accounts. The cyber-security system 201 may request login information from the consumer. Accounts may be determined according to one or more methods. For example, the consumer may supply the cyber-security system 201 with identifying information, such as a name, date of birth, address, social security number, or other such information. The cyber-security system 201 may integrate with one or more services (such as social media websites, banking websites, etc.) which may inform the cyber-security system 201 whether the identifying information corresponds to an account on each service. In another example, the consumer may register to receive a digital safety score. As part of the registration, the consumer may be presented with a list of accounts, and may be asked to give credentials for the accounts. In yet another example, the consumer may supply the cyber-security system 201 with access to an aggregation service, such as a password manager, which may identify known accounts and/or credentials for each account. Some accounts, such as accounts with a credit monitoring service and/or identity protection service, may supply data indicating risk. In some instances, the cyber-security system 201 may find account data across numerous services and bring the data from all the services together so that it may bind the data into a value.

In an embodiment, the cyber-security system 201 may scan for devices associated with the consumer. The cyber-security system 201 may identify devices on a network associated with the consumer and/or devices associated with the consumer's credentials. For example, the cyber-security system 201 may initiate a network scan which may identify devices along a network and information corresponding to each device (e.g., device type, model numbers, operating systems, software versions, applications installed on the devices, network capabilities, etc.).

In another embodiment, the cyber-security system 201 may search for digitally-available information associated with the consumer (e.g., an online presence associated with the consumer). The cyber-security system 201 may initiate a scan for digitally-available information, such as by instructing the cyber-traffic event analysis system 222 to scan for consumer information (addresses, credit card numbers, credentials, social security numbers, etc.) that correspond to the consumer. In some instances, the cyber-traffic event analysis system may continually compile consumer data based on data found on the Internet. For example, the cyber-traffic event analysis system may monitor dark web pages for credit card numbers, addresses, phone numbers, etc. The cyber-security system 201 may also collect activity data associated with the consumer. For example, the cyber-security system 201 may track how often, on what devices, and/or where a consumer conducts banking transactions. A consumer may be penalized if the consumer conducts banking on a train, where other individuals may be able to more easily view the consumer's confidential banking information.

In yet another embodiment, the cyber-security system 201 may compare the consumer information with data known to correspond to the consumer. In some instances, the cyber-security system 201 may determine if data compiled by the cyber-traffic event analysis system matches data associated with the consumer. For example, the cyber-security system 201 may determine if a credit card number previously found on a dark web page and stored in a database of detected credit card numbers matches a credit card number entered by the consumer.

In an embodiment, the cyber-security system 201 may determine a value associated with the consumer. The cyber-security system 201 may use one or more algorithms to determine a value based on consumer accounts, consumer devices, online presence data, or other collected information. The cyber-security system 201 may compare the compiled data against risk matrices to determine the likelihood of a data breach based on the collected data. For example, a user with a large number of devices and accounts may have a high probability of a data breach and be assigned a low value.

In an embodiment, the cyber-security system 201 may update a marketplace with the value. Risk information (e.g., a value and/or the information from which the value is derived) may be a valuable tool for determining the risk of a data breach associated with a consumer. For example, the value may indicate that there is a 20% chance that a consumer will fall victim to credit card fraud within the next six months.

A marketplace may be established for buying and selling risk information. For instance, an insurance marketplace may allow insurance providers to access risk information from the cyber-security system 201. Insurance providers and/or underwriters may establish cyber-fraud insurance policies based on the risk information. For example, an insurance provider may offer an insurance policy to the consumer that protects against fraudulent transactions based on the risk information. If a consumer incurs financial damage as a result of a data breach (for example, the consumer is subjected to credit card fraud), the insurance policy may compensate the consumer for some or all financial losses incurred.

Premiums and/or deductibles for insurance policies may be established based on the risk information and/or value associated with a potential for data breach of a consumer's data. For example, a consumer with a high value may be charged a higher premium than a consumer with a low value.

In some instances, the risk information may be collected and used to determine behavioral patterns for a class of consumer. Over time, the cyber-security system 201 may determine the behavioral patterns based on detecting associations between different data points known to the cyber-security system 201. For example, the cyber-security system 201 may determine that individuals with more than two credit card numbers detected on the Internet have a 65% chance of credit card fraud, while individuals with two or less credit card numbers detected on the Internet have a 38% chance of credit card fraud. The cyber-security system 201 may continually iterate on this information to determine more and/or more accurate associations and/or patterns. For example, using data collected over time, the cyber-security system 201 may determine that individuals with at least 5 active social networking accounts have a 15% greater chance of suffering from tax fraud than individuals with less than 5 active social networking accounts. Thus, the cyber-security system 201 may determine an increased chance of tax fraud when a consumer registers a fifth social networking account (and, in some instances, provide a notification to a user and/or service provider after the fifth social networking account is registered).

In some instances, the determined, resultant behavioral data representing the behavioral patterns and/or the data used to determine behavioral patterns may be made available through the marketplace. A database of patterns may be made available detailing the risks associated with given behaviors (e.g., the risk of a data breach based on a given digital footprint). An insurer may pay to have access to a marketplace of the data in order to better tailor insurance products for a consumer based on associated risk. For example, the insurer may increase premiums for all customers by 7% because the data used to determine behavioral patterns indicates an overall 7% increase in cyber-crime in the past 18 months. In some instances, a governmental entity, such as law enforcement, may subscribe to the marketplace in order to determine how best to predict, identify, and/or react to cyber-crime. Data may also be used for advertising purposes. An advertiser may use the data to associate online activity with demographic information for targeted advertising. For example, an advertiser may determine a demographic of consumers aged 20-28 with at least 6 social networking accounts in order to conduct a targeted advertising campaign for a new social network. In another example, a post-card company may determine a list of consumers with no social networking accounts for mailing an advertisement comprising a selection of post-cards.

In some instances, access to the marketplace may be restricted and/or incur a fee. For example, a fee may be charged to access risk information collected by the cyber-security system 201. In some instances, the cyber-security system 201 may collect information from a variety of sources (e.g., credit monitoring services, identity theft protection services, consumer information protection services, etc.), and store the combined information in a database. In some instances, a separate fee may be charged for access to only a subset of the database information.

In another embodiment, the cyber-security system 201 may determine if an action event has been detected. An action event may comprise a detected change in a consumer account and/or detection of a data breach. For example, the cyber-traffic event monitoring system 222 may detect that a credit card number associated with a consumer with a known value has been published on a website.

In some instances, an action event may be an action taken by the consumer. A consumer may register a new account online, open up a new financial service account, start using a password manager, connect a new device, or undergo cyber-security training. As a result of the action, the cyber-security system 201 may wish to adjust the value. For example, by adding additional accounts online, the consumer may be more susceptible to a data breach and the value may be lowered. In another example, the consumer may perform cyber-security training, and may be rewarded with a higher value.

In another embodiment, the cyber-security system 201 may notify the consumer of the action event. To reduce the impact of a data breach, it may be advantageous to notify the consumer and/or services associated with the data breach. For example, the cyber-security system 201 may trigger a notification to appear on a user mobile computing device 210 indicating that credentials have been leaked for an account. In another example, the cyber-security system 201 may notify a credit card company that a credit card number for the consumer was detected on the dark web. The consumer and/or service provider may then take action to reduce any potential damage resulting from the data breach.

In another embodiment, the cyber-security system 201 may adjust the value. Information indicating if a breach is more or less likely to occur may affect a value. In some instances, an actual data breach may indicate that a breach is more likely to occur in the future, lowering the value. For example, if a data breach has occurred, the value may be lowered. In another example, a value may be raised when a user deletes old social media accounts that the consumer no longer uses. In yet another example, a value may be raised when a user enacts stronger privacy policies on accounts, such as social media accounts.

Figure 5:
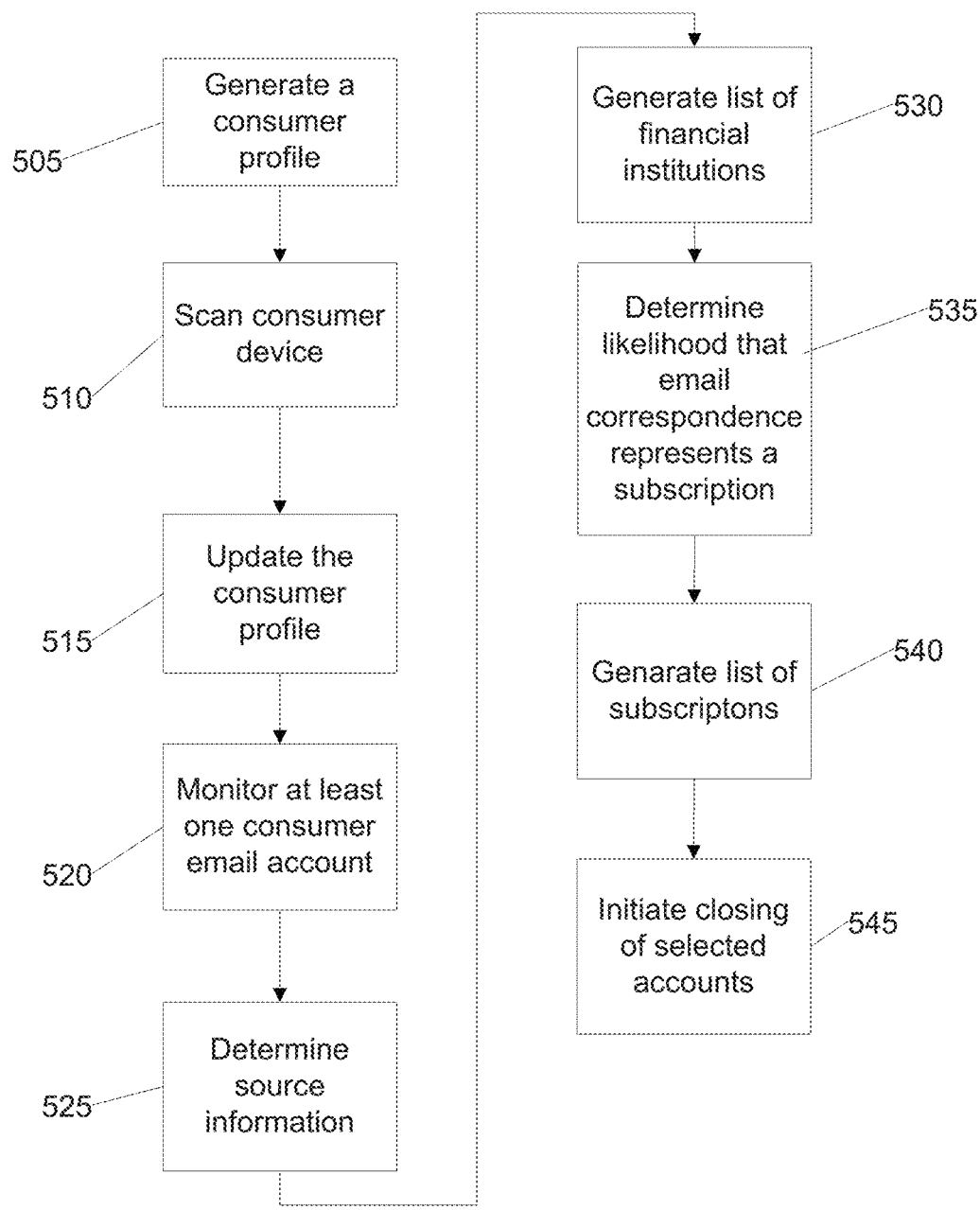
FIG. 5 illustrates an exemplary method for identifying and categorizing accounts associated with a consumer in accordance with one or more aspects described herein.

FIG. 5 depicts a method for assisting a consumer in keeping track of a consumer's accounts in order to prevent unauthorized access or use of the consumers identified subscriptions and financial accounts. The discovered subscriptions and financial accounts may be displayed to the consumer along with recommendations and assistance for closing unused or unwanted financial accounts and subscriptions to prevent unauthorized access or use.

At step 505, cyber-security system 201 may generate a consumer profile based on received and collected consumer information. The consumer information may be collected by cyber-traffic event analysis system 222 which may continuously scan for updated consumer information (addresses, credit card numbers, credentials, social security numbers, etc.).

At step 510, cyber-security system 201 may scan a consumer device to determine potential security threats. The cyber-security system 201 may determine characteristics of any discovered device. The determined characteristics may include operating system version, update history, installed software, hardware characteristics, and so forth.

At step 515, cyber-security system 201 may associate the consumer device and the results of the scan with the generated consumer profile. In an embodiment, cyber-security system 201 may update the consumer profile based on the results of the scan.

In accordance with another embodiment, cyber-security system 201 at step 520 may monitor at least one email account of the consumer. A consumer's email password and access information may have been provided by the consumer during an account setup process. The cyber-security system 201 may parse the metadata found in each email header to determine source information for each email correspondence in the consumer's email account. The parsed metadata may include a domain name identifying the source of the email correspondence. In an embodiment, monitoring of the consumer's email account may be limited to a consumer's inbox or specified folders containing email correspondence. In an embodiment, based on the determined source information for each email correspondence, cyber-security system 201 may at step 530 generate a list of financial institutions and other businesses associated with a consumer. In one embodiment, this list may also be created using the analysis of a consumer's email and checking the information against application programming interfaces, such as Yodlee. The list of financial institutions and other businesses may be verified with the consumer profile or other gathered information regarding the consumer. The list of financial institutions and other businesses may be displayed to the consumer.

At step 535, cyber-security system 201 may determine for each email correspondence a likelihood that each email correspondence represents an account of the consumer. Cyber-security system 201 may in at least one embodiment, determine that an email contains references to an existing account based on results from a pattern recognition algorithm, such as natural language processing. The pattern recognition algorithm may search for various words, phrases, or other identifiable criteria. For instance, the pattern recognition algorithm may search for the word unsubscribe in an email correspondence indicating that the email correspondence is associated with an existing account.

In another embodiment, based on the determined likelihood that each email correspondence represents a subscription of the consumer, cyber-security system 201 at step 540 may generate a list of accounts associated with the consumer. The generated list of accounts may be displayed to the consumer and stored in the consumer profile record.

In an embodiment, cyber-security system 201 may automatically initiate closing of select accounts listed in one of the generated lists based on predetermined criteria. For instance, cyber-security system 201 may close accounts which have not been accessed for a predetermined period of time such as greater than one year. In another embodiment, cyber-security system 201 may generate recommendations based on the identification of the sources of the accounts. In another embodiment, the consumer may determine that various accounts should be closed based on a review of the listings. In this case, a consumer may indicate via a user interface that various accounts should be closed and cyber-security system 201 may begin an account closing process for the consumer.

In an embodiment, a consumer's email account may be monitored at a predetermined frequency in order to update the account listings. The newly generate lists may be compared to previously generated lists highlighting changes for the consumer. In this way, the process is iterative. In addition, cyber-security system 201 may identify high security risk accounts and immediately communicate those high risk accounts to the consumer.

In yet another embodiment, cyber-security system 201 may learn to identify false positives as it repeatedly scans email accounts and receives feedback from consumers. In another embodiment, consumers may be able to identify accounts that should remain open though they are not frequently utilized. These accounts may be selected by the consumer via a user interface so that false positives are further reduced.

Figure 6:
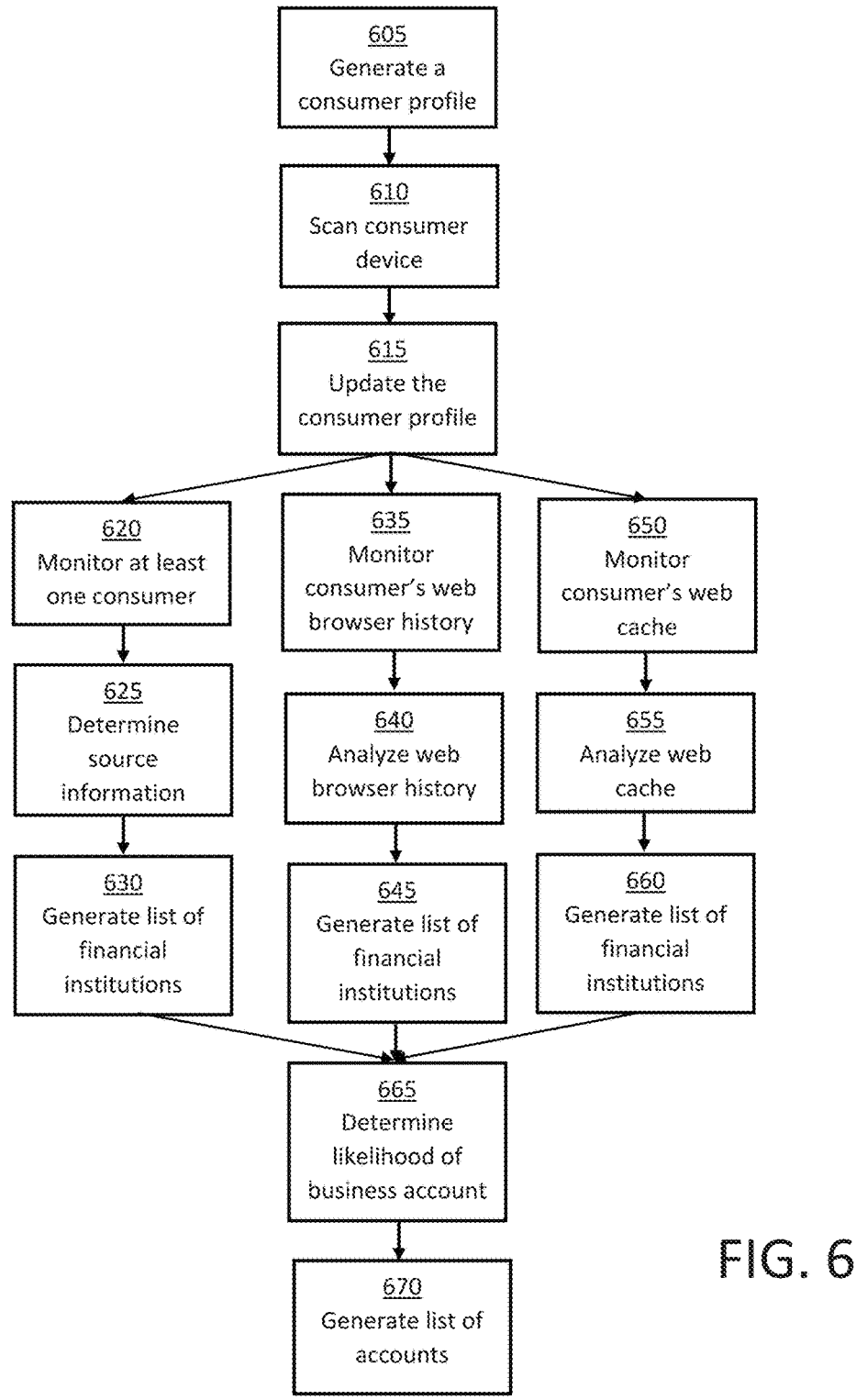
FIG. 6 illustrates an exemplary method for identifying and categorizing accounts associated with a consumer in accordance with one or more aspects described herein.

FIG. 6 depicts another method for assisting a consumer in keeping track of a consumer's accounts in order to prevent unauthorized access or use of the consumers identified subscriptions and financial accounts. At step 605, cyber-security system 201 may generate a consumer profile based on received and collected consumer information. The consumer information may be collected by cyber-traffic event analysis system 222 which may continuously scan for updated consumer information (addresses, credit card numbers, credentials, social security numbers, etc.).

At step 610, cyber-security system 201 may scan a consumer device to determine potential security threats. The cyber-security system 201 may determine characteristics of any discovered device. The determined characteristics may include operating system version, update history, installed software, hardware characteristics, and so forth.

At step 615, cyber-security system 201 may associate the consumer device and the results of the scan with the generated consumer profile. In an embodiment, cyber-security system 201 may update the consumer profile based on the results of the scan.

At step 620, cyber-security system 201 may monitor at least one email account of the consumer. A consumer's email password and access information may have been provided by the consumer during an account setup process. At step 625, the cyber-security system 201 may parse the metadata found in each email header to determine source information for each email correspondence in the consumer's email account. The parsed metadata may include a domain name identifying the source of the email correspondence. In an embodiment, monitoring of the consumer's email account may be limited to a consumer's inbox or specified folders containing email correspondence. Cyber-security system 201 may also determine that an email contains references to an existing account based on results from a pattern recognition algorithm, such as natural language processing. The pattern recognition algorithm may search for various words, phrases, or other identifiable criteria. For instance, the pattern recognition algorithm may search for the word unsubscribe in an email correspondence indicating that the email correspondence is associated with an existing account. Based on the analysis of a consumer's email correspondence, cyber-security system 201 may at step 630 generate a list of businesses a consumer may have an account with. In one embodiment, this list may also be created using the analysis of a consumer's email and checking the information against application programming interfaces, such as Yodlee.

At step 635, cyber-security system 201 may monitor a consumer's web browser history, including cookies. This could be done over a consumer's various browsers (e.g., Chrome, Internet Explorer, Firefox). At step 640, the cyber-security system 201 may analyze which websites a consumer visited, which websites stored cookies on a consumer's device, how frequently a consumer visited specific websites, or how recently a consumer visited a website. Based on a consumer's web browsing activity, cyber-security system 201 may generate a list of businesses associated with a consumer (i.e., step 645). Further, cyber-security system 201 may order the list of businesses associated with a consumer based on likelihood the consumer has an account with a particular business. For instance, websites that the consumer visits more frequently and/or more recently may be placed higher on the list as they may indicate a stronger likelihood the consumer has an account with that particular business. In one embodiment, this list may also be created using the analysis of a consumer's web browser history and checking the information against application programming interfaces, such as Yodlee.

At step 650, cyber-security system 201 may monitor a consumer's web cache. This, again, could be done over a consumer's various browsers (e.g., Chrome, Internet Explorer, Firefox). At step 655, the cyber-security system 201 may analyze consumer's cache to pass along data to create generate a list of businesses associated with a consumer (i.e., step 660). In one embodiment, this list may also be created using the analysis of a consumer's web cache and checking the information against application programming interfaces, such as Yodlee.

At step 665, cyber-security system 201 analyzes the three lists generated from steps 630, 645, and 660 to determine a likelihood that each business represents a business the consumer has an account with. Cyber-security system 201 may in at least one embodiment, determine that a consumer has an account with a certain business because it appears on all three lists. Alternatively, a business that only appears on the list associated with a consumer's browser history would not indicate the consumer has an account with that business. Cyber-security system 201 may place different weights on the various lists in determining whether a consumer has an account with a certain business. For instance, cyber-security system 201 may determine a consumer has an account with a particular business if that particular business appears on the lists generated from the analysis of a consumer's email and web browsing history. In comparison, cyber-security system 201 may determine a consumer does not have an account with a particular business even though that particular business appears on the lists generated from the analysis of a consumer's web browsing history and web cache.

In an alternative embodiment, cyber-security system 201 uses the lists generated in steps 645 and 660 to verify the list generated in step 630, which was based on the analysis of a consumer's email account. In this embodiment, cyber-security system 201 uses the lists generated at steps 645 and 660 to filter out false positives and increase the accuracy of the list generated in step 630.

At step 670, cyber-security system 201 generates a summary list based on its analysis in step 665. This list of businesses may be categorized at least by type, subject matter, or nature of use to provide an indication of how a consumer uses the internet. This list of businesses may also be verified with the consumer profile or other gathered information regarding the consumer. The list of businesses may be also displayed to the consumer.

In another embodiment, based on the determined likelihood that a consumer has an account with each business, cyber-security system 201 may generate a list of businesses associated with the consumer and possible accounts. The generated list of associated businesses and possible accounts may be displayed to the consumer and stored in the consumer profile record. This list of associated businesses and possible accounts may be categorized at least by type, subject matter, or nature of use to provide a picture of how a consumer uses the internet. In another embodiment, cyber-security system 201 may include which possible accounts store data, including what type of data is stored. In this manner, cyber-security system 201 is able to assess how exposed a consumer's personal data is exposed online and share that information with the consumer.

In an embodiment, cyber-security system 201 may automatically initiate closing of select accounts listed in one of the generated lists based on predetermined criteria. For instance, cyber-security system 201 may close accounts which have not been accessed for a predetermined period of time such as greater than one year. In another embodiment, cyber-security system 201 may generate recommendations based on the identification of the sources of the accounts. In another embodiment, the consumer may determine that various accounts should be closed based on a review of the listings. In this case, a consumer may indicate via a user interface that various accounts should be closed and cyber-security system 201 may begin an account closing process for the consumer.

In yet another embodiment, cyber-security system 201 may include systems or methods to detect account breaches. These systems would monitor a consumer's accounts to determine whether an account had been breached. If the system determined a breach of an account had occurred, cyber-security system 201 would then analyze the impact of the breach and whether it affects multiple accounts of the consumer. Cyber-security system 201 would then provide the consumer with a notice of the breach as well as the extent of the breach. The consumer may then instruct cyber-security system 201 to close the compromised account. The consumer may then determine which compromised accounts should be closed. In this case, a consumer may indicate via a user interface that various accounts should be closed and cyber-security system 201 may begin an account closing process for the consumer. In an alternative embodiment, cyber-security system 201 may automatically initiate the closing of any compromised accounts. Cyber-security system 201 would then provide the consumer with a notice of the breach, the extent of the breach, and confirmation of the closing of accounts.

In a further embodiment, cyber-security system 201 may determine the frequency of a consumer's use of accounts. This determination would add to cyber-security system 201's assessment of a consumer's online risk exposure. This would allow cyber-security system 201 to determine the appropriate solution to a possible risk. This risk determination and possible solutions may be displayed to the consumer. Alternatively, cyber-security system 201 may automatically initiate what it determines are the appropriate solutions to lessen a consumer's online risk exposure.

In an embodiment, a consumer's email account, web browsing history, and web cache may be monitored at a predetermined frequency in order to update the account listings. The newly generate lists may be compared to previously generated lists highlighting changes for the consumer. In this way, the process is iterative. In addition, cyber-security system 201 may identify high security risk accounts and immediately communicate those high risk accounts to the consumer.

In another embodiment, cyber-security system 201 may learn to identify false positives as it repeatedly scans the various consumer information and receives feedback from consumers. In another embodiment, consumers may be able to identify accounts that should remain open though they are not frequently utilized. These accounts may be selected by the consumer via a user interface so that false positives are further reduced.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A cyber-security system comprising a cyber-security account analysis system and a cyber-security data processing system, wherein the cyber-security system includes:
   a processor;
   a memory unit storing computer-executable instructions, which when executed by the processor, cause the cyber-security data processing system to:

generate a consumer profile based on consumer information;
scan a consumer device to determine potential software application threats and hardware element vulnerabilities;
generate a list of hardware elements and software applications discovered during the scan of the consumer device;
associate the consumer device and the results of the scan with the generated consumer profile;
generate recommendations based on the determined software application threats and hardware element vulnerabilities;
display recommendations to a consumer;
wherein the cyber-security account analysis system is configured to:
monitor at least one email account of the consumer;
determine source information for each email correspondence in the monitored at least one email account of the consumer;
based on the determined source information for each email correspondence, generate a separate list of businesses associated with the consumer;
monitor a consumer's web browsing history information;
analyze the consumer's web browsing history information to determine a group of businesses associated with the consumer;
based on the analysis of the consumer's web browsing history information, generate a separate list of businesses associated with a consumer;
monitor a consumer's web cache;
analyze the consumer's web cache to determine a group of businesses associated with a consumer;
based on the analysis of the consumer's web cache, generate a separate list of businesses associated with the consumer;
determine for each business associated with a consumer a likelihood that the consumer has an account with a business;
based on the determined likelihood that each business represents an account of the consumer, generate a list of accounts associated with the consumer; and
initiate the closing of certain accounts associated with the consumer based on security recommendations, the certain accounts associated with the consumer determined based on at least one of the generated separate lists of businesses associated with the consumer, and the generated list of the accounts associated with the consumer.

2. The cyber-security system of claim 1, wherein the cyber-security account analysis system is further configured to:
identify high risk accounts based on the security recommendations.

3. The cyber-security system of claim 1, wherein the cyber-security data analysis system is further configured to:
determine a digital safety score based on the generated consumer profile, the generated separate lists of businesses associated with the consumer, and the generated list of accounts associated with the consumer.

4. The cyber-security system of claim 3, wherein the cyber-security data processing system is further configured to:
receive additional consumer information;
update the generated consumer profile; and
update the determined digital safety score based on the updated consumer profile.

5. The cyber-security system of claim 1, wherein the cyber-security data analysis system is further configured to:
determine whether an account of the consumer has been breached; and
determine whether the breach has affected other accounts of the consumer.

6. The cyber-security system of claim 1, wherein the cyber-security data analysis system is further configured to determine a frequency the consumer accesses each account associated with the consumer.

7. A method comprising:
monitoring at least one email account of a consumer;
determining source information for each email correspondence in the monitored at least one email account of the consumer;
based on the determined source information for each email correspondence, generating a separate list of businesses associated with the consumer;
monitoring a consumer's web browsing history information;
analyzing the consumer's web browsing history information to determine a group of businesses associated with the consumer;
based on the analysis of the consumer's web browsing history information, generating a separate list of businesses associated with the consumer;
monitoring a consumer's web cache;
analyzing the consumer's web cache to determine a group of businesses associated with the consumer;
based on the analysis of the consumer's web cache, generating a separate list of businesses associated with the consumer;
determining for each business associated with a consumer a likelihood that the consumer has an account with a business;
based on the determined likelihood that each business represents an account of the consumer, generating a list of accounts associated with the consumer;
scanning a consumer device to determine potential software application threats and hardware element vulnerabilities;
generating a list of hardware elements and software applications discovered during the scan of the consumer device;
generating recommendations based on the determined software application threats and hardware element vulnerabilities; and
initiating the closing of certain accounts associated with consumer based on security recommendations, the certain accounts associated with the consumer determined based on at least one of the generated separate list of businesses associated with the consumer and the generated list of the accounts associated with the consumer.

8. The method of claim 7, further comprising:
identifying high risk accounts based on the security recommendations.

9. The method of claim 7, further comprising:
determining a digital safety score based on the generated separate list of businesses associated with the consumer, and the generated list of accounts associated with the consumer.

10. The method of claim 7, further comprising:
determining whether an account of the consumer has been breached; and determining whether the breach has affected other accounts of the consumer.

11. The method of claim 7, further comprising:
determining a frequency the consumer accesses each account associated with a consumer.

12. A cyber-security system comprising a cyber-security account analysis system and a cyber-security data processing system, wherein the cyber-security system includes:
a processor;
a memory unit storing computer-executable instructions, which when executed by the processor, cause the cyber-security data processing system to:
generate a consumer profile based on consumer information;
scan a consumer device to determine potential software application threats and hardware element vulnerabilities;
generate a list of hardware elements and software applications discovered during the scan of the consumer device;
associate the consumer device and the results of the scan with the generated consumer profile;
generate recommendations based on the determined software application threats and hardware element vulnerabilities;
display recommendations to a consumer;
wherein the cyber-security account analysis system is configured to:
monitor at least one email account of the consumer;
determine source information for each email correspondence in the monitored at least one email account;
based on the determined source information for each email correspondence, generate a separate list of businesses associated with the consumer;
monitor a consumer's web browsing history information;
analyze the consumer's web browsing history information to determine a group of businesses associated with the consumer;
based on the analysis of the consumer's web browsing history information, generate a separate list of businesses associated with the consumer;
monitor a consumer's web cache;
analyze the consumer's web cache to determine a group of businesses associated with the consumer;
based on the analysis of the consumer's web cache, generate a separate list of businesses associated with the consumer;
determine for each business associated with consumer a likelihood the consumer has an account with a business;
based on the determined likelihood that each business represents an account of the consumer, generate a list of accounts associated with the consumer; and
initiate the closing of certain accounts associated with the consumer based on security recommendations, the certain accounts associated with the consumer determined based on at least one of the generated separate list of businesses associated with the consumer and the generated list of the accounts associated with the consumer.

13. The cyber-security system of claim 12, wherein security recommendations comprise a number of consecutive days of account inactivity.

14. The cyber-security system of claim 12, wherein cyber-security account analysis system is further configured to:
display a hyperlink for each listed account to enable the consumer to close an account upon hyperlink activation.

15. The cyber-security system of claim 12, wherein the cyber-security account analysis system is further configured to:
identify high risk accounts based on the security recommendations.

16. The cyber-security system of claim 12, wherein the cyber-security data processing system is further configured to:
determine a digital safety score based on the generated consumer profile, the generated separate list of businesses associated with the consumer, and the generated list of accounts associated with the consumer.

17. The cyber-security system of claim 12, wherein the cyber-security data processing system is further configured to:
receive additional consumer information;
update the generated consumer profile; and
update the determined digital safety score based on the updated consumer profile.

* * * * *